United States Patent [19]

Bildsoe

[11] Patent Number: 5,673,780
[45] Date of Patent: Oct. 7, 1997

[54] METHOD OF INSTALLING A LEVEL BALL BEARING FLOOR

[75] Inventor: Jorgen S. Bildsoe, St. Paul, Minn.

[73] Assignee: International Automated Systems, Inc., St. Paul, Minn.

[21] Appl. No.: 603,580

[22] Filed: Feb. 20, 1996

[51] Int. Cl.⁶ .................................................. B65G 11/00
[52] U.S. Cl. ..................... 193/35 MD; 52/177; 52/747.1; 108/55.3; 404/31; 404/94
[58] Field of Search ............................ 52/741.1, 745.05, 52/747.1, 177, 181, 29, 741.41, 745.21; 108/55.3; 193/35 MD; 404/31, 94

[56] References Cited

U.S. PATENT DOCUMENTS

| | | | |
|---|---|---|---|
| 2,949,992 | 8/1960 | Weinberg | 193/35 MD |
| 4,060,252 | 11/1977 | Mowery | 193/35 MD X |
| 4,347,794 | 9/1982 | Nordstrom | 193/35 MD X |
| 4,580,680 | 4/1986 | Win | 108/55.3 X |
| 4,684,289 | 8/1987 | Gnesa | 404/54 X |
| 4,793,731 | 12/1988 | Gnesa | 404/94 X |
| 4,850,738 | 7/1989 | Niemi | 404/31 |
| 4,906,523 | 3/1990 | Bilkadi | 404/94 X |
| 4,945,697 | 8/1990 | Ott et al. | 52/396 |
| 5,007,764 | 4/1991 | Pontynen | 404/31 X |
| 5,033,601 | 7/1991 | Huber | 193/35 MD |
| 5,076,412 | 12/1991 | Huber | 193/35 MD |
| 5,185,013 | 2/1993 | Martin | 52/514 |
| 5,219,057 | 6/1993 | Sundseth | 193/35 MD |
| 5,219,058 | 6/1993 | Sundseth | 193/35 MD |
| 5,226,279 | 7/1993 | Rendon-Herrero | 52/743.1 |
| 5,297,663 | 3/1994 | Sundseth | 193/35 MD |
| 5,390,775 | 2/1995 | Herrick et al. | 193/35 MD X |
| 5,453,320 | 9/1995 | Harper et al. | 428/356 |
| 5,464,086 | 11/1995 | Goelln | 193/35 MD X |

Primary Examiner—Carl D. Friedman
Assistant Examiner—Beth A. Aubrey
Attorney, Agent, or Firm—Kinney & Lange, P.A.

[57] ABSTRACT

A method of installing a level ball bearing floor. The method includes applying a self-leveling coating over a base. A plurality of support plates are mounted on the self-leveling coating. A plurality of ball bearing units are then mounted on each support plate. The ball bearing floor maintains each of the ball bearing units of within 1/16 of an inch of the same height.

9 Claims, 2 Drawing Sheets

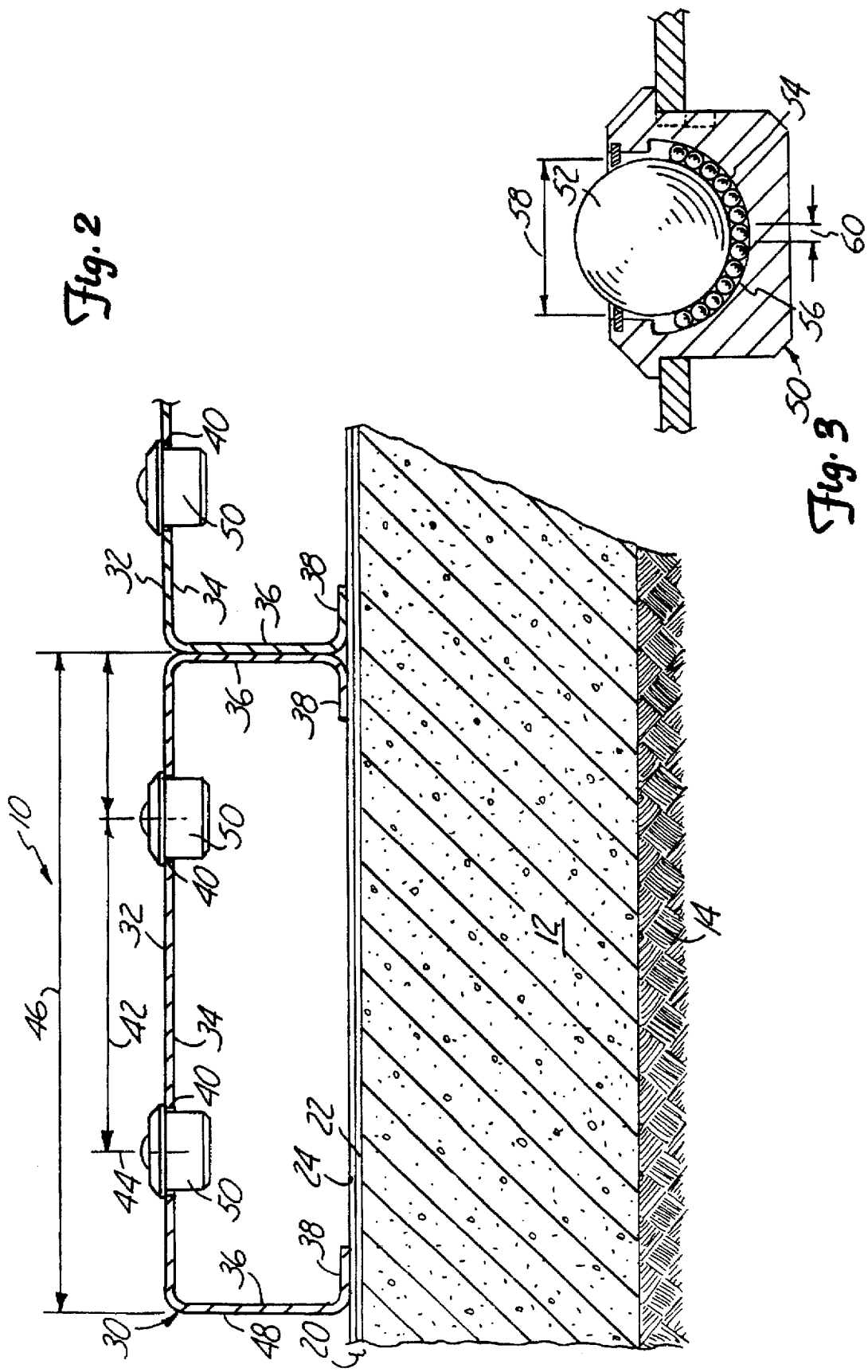

METHOD OF INSTALLING A LEVEL BALL BEARING FLOOR

BACKGROUND OF THE INVENTION

The present invention relates generally to a method of installing a floor that enables objects to be readily moved along the floor without mechanical assistance. More particularly, the present invention relates to a method of installing a substantially level ball bearing floor.

In conjunction with large-scale handling of air cargo, the air cargo is typically placed on standardized pallets. Air cargo pallets are typically rectangularly shaped and have surfaces of up to greater than 60 square feet. It is not uncommon for the air cargo pallets to be capable of supporting loads of 10,000 pounds or more without experiencing damage during the air cargo handling process.

It has been found that installing a network of roller conveyor lines along with ball bearing transfer decks in an air cargo freight terminal allows air cargo pallets to be moved in a cost-effective manner without the use of motorized machinery, such as forklifts. The ball bearing transfer deck allows for multi-directional movement as well as rotation of the pallet.

The ball bearing transfer deck contains a metal deck on which large number of ball bearing units are mounted. The ball bearing units are arranged on the ball bearing transfer deck to provide support over the surface of the pallet while providing a pathway for an operator who is pushing the pallet to walk.

To minimize the force that operators must exert to move pallets over the ball bearing transfer deck, it is desirable for the ball bearing transfer deck to be mounted in a substantially level orientation. When the ball bearing transfer deck is not in a substantially level orientation, a larger force is needed to move a loaded pallet in an uphill direction.

Prior to the present invention, ball bearing transfer decks were leveled using mechanical devices, such as adjustable anchors and shims. However, adjusting ball bearing transfer decks to a precisely level orientation with mechanical devices is a very difficult and time consuming process because of the relatively large size of ball bearing transfer decks. Because of the forces exerted on the ball bearing transfer deck by the pallets moving over the ball bearing transfer deck, the prior art ball bearing deck require periodic adjustments to maintain the ball bearing transfer decks in the precisely level orientation.

While the ball bearing transfer deck has the potential to greatly increase the flexibility in configuring a freight terminal, this potential is hampered by the fact that none of the prior art ball bearing transfer decks provide a surface that is level when installed and that remains level during use.

SUMMARY OF THE INVENTION

The present invention includes a method of installing a level ball bearing floor. When a pallet containing a load of up to approximately 10,000 pounds is placed on the ball bearing floor, an operator is able to move the pallet using a lateral force of less than 25 pounds per 1,000 pounds of load on the pallet.

The method includes pouring a self-leveling coating over a base and allowing the self-leveling coating to cure. Next, a ball bearing transfer deck is formed by mounting a plurality of support plates on the cured self-leveling coating. Each of the support plates has a plurality of ball bearing units. The ball bearing floor maintains the ball bearing units in a level orientation such that each of the ball bearing units within an approximately 10 foot by 10 foot area are maintained within $1/16$ of an inch of the same height.

BRIEF DESCRIPTION OF THE DRAWINGS

FIG. 2 is a sectional view of a support plate taken along line 2—2.

FIG. 3 is a sectional view of a ball bearing unit.

DETAILED DESCRIPTION OF THE PREFERRED EMBODIMENTS

Figure 1:
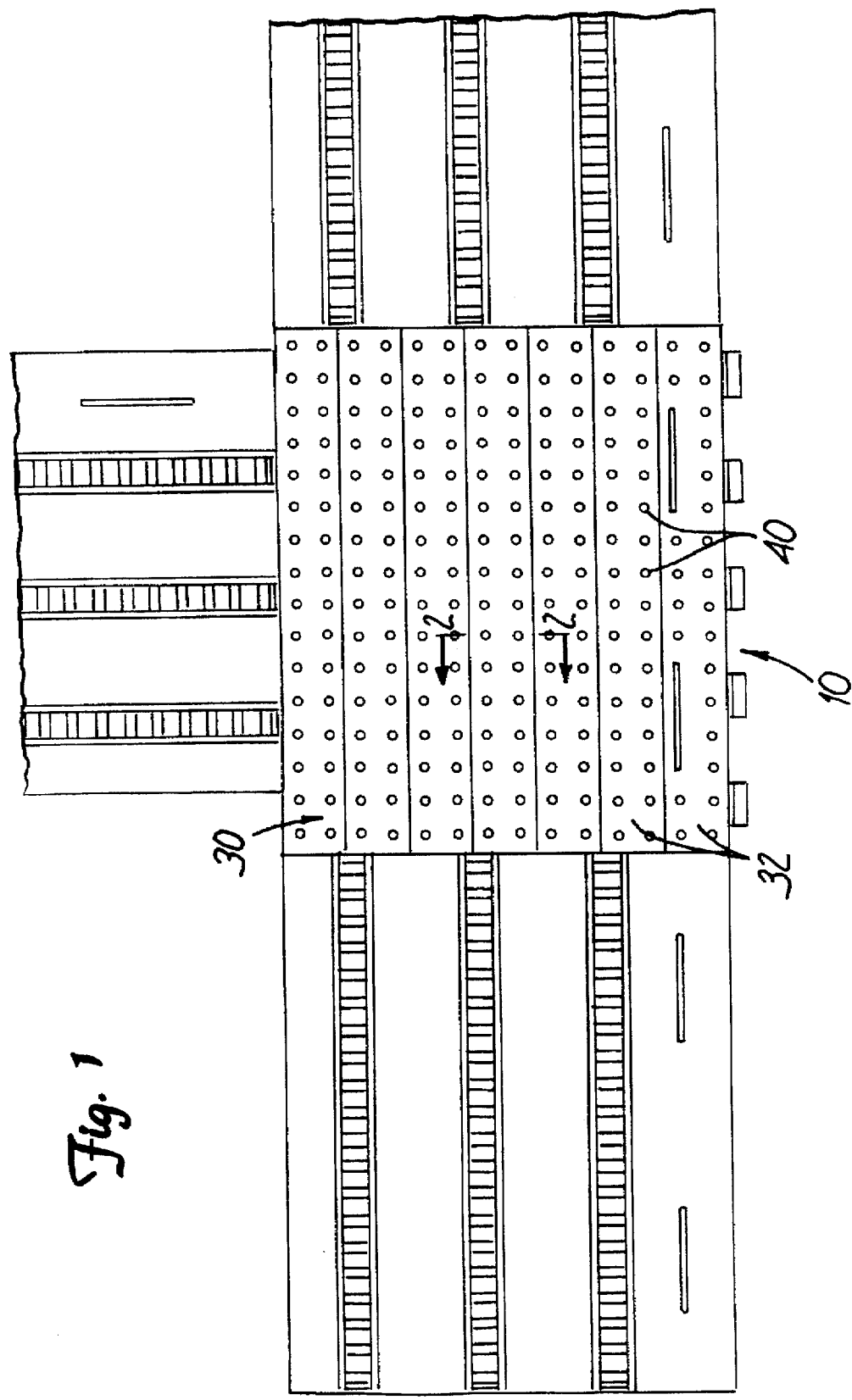
FIG. 1 is a top plan view of a ball bearing floor.

The method of the present invention includes forming a level ball bearing floor, as illustrated at 10 in FIG. 1. As used herein, the term "level" means that an approximately 10 foot by 10 foot area of the ball bearing floor is level to within $1/16$ of an inch and preferably within $1/32$ of an inch. Additionally, the level ball bearing floor prepared according to the method of the present invention remains level when pallets containing loads of up to approximately 10,000 pounds are moved over the ball bearing floor.

The level orientation of the ball bearing floor allows a pallet containing a load of up to approximately 10,000 pounds to be manipulated using a lateral force of 250 pounds or less. The method of the present invention thereby enables the pallets to be moved without the use of motorized transport machinery. Maintaining the components of the ball bearing floor in a level orientation also minimizes damage to a lower surface of the pallet as the pallet is moved over the ball bearing floor.

As a preliminary step in installing the level ball bearing floor according to the method of the present invention, a base 12 is formed in the area where the ball bearing floor is to be installed, as illustrated in FIG. 2. The base is preferably fabricated from concrete. The thickness of the base is selected so that the base is capable of supporting loads of up to approximately 10,000 pounds without exhibiting deformation or degradation. Additionally, a material 14 on which the base 12 is formed is prepared using conventionally known techniques to ensure that the material 14 does not settle or allow the base 12 to tilt after the ball bearing floor 10 is formed on the base 12.

A self-leveling coating 20 is then applied over the base 12. Depending on the levelness of the base 12, the self-leveling coating 20 may be applied in a single layer or may be applied in multiple layers. Preferably, the self-leveling coating 20 is applied in two layers.

A first layer 22 is preferably a self-leveling, cementuous topping. The thickness of the first layer 22 is selected based on the difference between the high points and the low points of the base 12. Preferably, the first layer 22 has a thickness of at least $1/8$ of an inch over all portions of the base 12.

The cementuous topping is selected to exhibit a high impact load resistance and a relatively short cure time. A cementuous topping having these characteristics may be obtained from Ardex Inc. of Philadelphia, Pa., under the designation K-500.

The first layer 22 is allowed to cure until the first layer 22 attains a desired degree of hardness. When using K-500 cementuous topping, the first layer 22 is preferably allowed to cure for at least approximately 48 hours.

After the first layer 22 is cured, a second layer 24 is applied over the first layer 22. The second layer 24 is preferably a layer of self-leveling epoxy. The second layer 24 is applied at a thickness of between approximately $1/8$ and ¼ of an inch. As the second layer 24 is applied, the second layer 24 preferably has the consistency of water. Additionally, while the second layer 24 is hardening, the second layer 24 preferably does not shrink from its fluid condition. A self-leveling epoxy having the preceding characteristics is prime coat 4000 epoxy.

Similar to the first layer 22, the second layer 24 is preferably allowed to cure for at least approximately 48 hours. After curing, the second layer 24 is level over an approximately 10 foot by 10 foot area to within 1/16 of an inch and preferably to within 1/32 of an inch.

The ball bearing transfer deck 30 is then formed on the second layer 24. The ball bearing transfer deck 30 is preferably formed from a plurality of steel support plates 32. The steel used to fabricate the support plates 32 is selected with a strength that is sufficient to support the weight of a load pallet as well as the weight of the operator without deformation. A steel possessing the preceding characteristics is pickled and oiled mild steel having a thickness of at least approximately 3/16 of an inch.

To further strengthen the support plate 32, the support plate 32 is preferably formed with a C-shaped profile. The support plate 32 includes a body portion 34, two side portions 36, and two wing portions 38. The side portions 36 provide the body portion 34 with additional structural rigidity. One of the wing portions 38 extends inwardly from an end of each of the side portions 36 that is opposite the body portion 34. The wing portions 38 provide further structural rigidity to the body portion 34.

The support plate 32 is preferably approximately 116 inches long and has a width of approximately 14½ inches and a thickness of 4 inches. To provide the ball bearing transfer deck 30 with a desired degree of accuracy, each of the dimensions on the support plate 32 are maintained at within approximately 1/32 of an inch of the specified values.

A conventional sheet steel brake is preferably used to bend the steel into the C-shaped profile with the specified accuracy. Alternatively, the C-shaped profile may be formed in a rolling mill.

The body portion 34 includes a plurality of apertures 40. The apertures 40 are arranged on the body portion 34 to form a regular pattern along each support plate 32 as well as along adjacent support plates, as most clearly illustrated in FIG. 1. The apertures 40 are preferably arranged in a pattern wherein a distance 42 between the centers 44 of adjacent apertures is approximately ½ of a width 46 of the support plate 32, as illustrated in FIG. 2. Additionally, the apertures 40 are preferably oriented approximately ¼ of the width 46 of the support plate 32 away from a side edge 48 of the support plate 32.

When using the support plate with a 14½ inches width 46, the spacing between the centers 44 of the adjacent apertures 40 is approximately 7¼ inches and the centers 44 of the apertures 40 is approximately 3⅝ inches from the side edge 48 of the support plate 32.

Each of the apertures 40 are adapted to receive a ball bearing unit 50. The ball bearing units 50 are preferably constructed in a modular configuration so that the ball bearing units 50 may be removed from the support plate 32 for maintenance or replacement. The ball bearing unit 50 includes a large ball bearing 52 that is seated on a plurality of smaller ball bearings 54 within a hemispherical cup 56, as most clearly illustrated in FIG. 3. The large ball bearing 52 preferably has a diameter 58 of approximately 1¼ inches.

The smaller ball bearings 54 are selected with a diameter 60 that is considerably smaller than the diameter 58 of the large ball bearing 52. The number of smaller ball bearings 54 on which the large ball bearing 52 is seated depends on the size of the ball bearing unit 50 and is preferably between 80 and 150 ball bearings. The construction of the ball bearing unit 50 allows each ball bearing unit 50 to rotate freely in any direction while supporting a weight of up to 200 kilograms.

Similar to the other components used to fabricate the ball bearing transfer deck 30, the ball bearing units 50 are accurately constructed so that the dimensions on each of the ball bearing units 50 are maintained to within 1/32 of an inch. A ball bearing unit 50 having the preceding characteristics may be obtained from SKF Specialty Products Company of Bethlehem, Pa., under the designation BT800-30-16/$57.

The ball bearing units 50 are placed into the apertures 40 on the support plates 32, and the support plates 32 are mounted in an adjacent relation so that the support plates 32 create a ball bearing transfer deck 30 having dimensions of approximately 10 foot by 10 foot. The heights of the ball bearings were analyzed and found to be level to within 1/16 of an inch.

To examine the performance of the ball bearing floor 10, a roller conveyor 70 was mounted adjacent to the ball bearing transfer deck 30, as illustrated in FIG. 1. A pallet conforming to the Air Force 463L standard was then placed on the roller conveyor. The 463L pallet has a length of approximately 108 inches, a width of approximately 88 inches, and a nominal weight of approximately 350 pounds. The 463L pallet is constructed from a balsa wood core that is covered on each side with aluminum sheets.

The 463L pallet was then loaded in approximately 2,000 pound increments by placing steel sheets on the 463L pallet. The breakaway force and the rolling force were measured at 2,000 pounds increments between 2,000 pounds and 10,000 pounds. As used herein, the term "breakaway force" means the force that is required to start movement of the pallet. As used herein, the term "rolling force" means the force required to sustain movement of the pallet.

The breakaway force and rolling force tests at each weight increment were repeated several times. The total force and the relative force for each weight increment are reported in Table 1. As used herein, the term "relative force" means the force per 1,000 pound load. At each of the weight increments, the relative breakaway force and the relative rolling force was less than 25 pounds.

TABLE 1

| Load on pallet | Breakaway force (pounds) | | Rolling force (pounds) | |
| --- | --- | --- | --- | --- |
| (pounds) | Total | Relative | Total | Relative |
| 2,000 | 20–25 | 10–13 | 15 | 8 |
| 4,000 | 26–70 | 7–18 | 15–50 | 4–13 |
| 6,000 | 40–90 | 7–15 | 15–55 | 3–9 |
| 8,000 | 65–175 | 8–22 | 40–120 | 5–15 |
| 10,000 | 75–170 | 7–17 | 55–120 | 6–12 |

For the 2,000, 4,000, 6,000, and 10,000 pound loads, the weight was distributed evenly on the pallet. For the 8,000 pound load, the weight was concentrated near the center of the pallet. It is believed that concentrating the weight near the center of the pallet caused the 8,000 pound load to exhibit greater values for the relative breakaway force and the relative rolling force.

A lower surface of the 463L pallet was examined for damage caused by the pallet passing over the ball bearing transfer deck. The lower surface showed only barely visible markings on the aluminum surface. For each of the weight increments, the depths of these markings were less than 0.012 inches.

Additionally, orienting the ball bearing units in a linear and square pattern where the centers of the ball bearing units are spaced at approximately 7¼ inches apart meets an Air Force specification that the ball bearing units be spaced no further than 8 inches apart. The spacing is wide enough to provide adequate room for an operator to place his foot between adjacent rows of ball bearing units in a safe and unhindered manner.

Although the present invention has been described with reference to preferred embodiments, workers skilled in the art will recognize that changes may be made in form and detail without departing from the spirit and scope of the invention.

What is claimed is:

1. A method of installing a level ball bearing floor, the method comprising: applying a self-leveling coating over a base;

mounting a plurality of support plates on the self-leveling coating; and mounting a plurality of ball bearing units on each of the support plates, wherein each of the ball bearing units is level to within $1/16$ of an inch when loads of up to approximately 10,000 pounds are moved over the ball bearing floor.

2. The method of claim 1 wherein a pallet containing a load of up to approximately 10,000 pounds is movable over the ball bearing floor with a force that is less than 25 pounds per 1,000 pounds of load on the pallet.

3. The method of claim 1 wherein the self-leveling coating is applied in a first and a second layer.

4. The method of claim 3 wherein the first layer is allowed to cure before the second layer is applied.

5. A method of fabricating a level ball bearing floor that allows a pallet containing a load of up to approximately 10,000 pounds to be moved on the ball bearing floor by applying a lateral force of less than 25 pounds per 1,000 pounds of load on the pallet, the method comprising:

forming a base from concrete;

applying a self-leveling coating over the base;

mounting a plurality of support plates on the self-leveling coating, each of the support plates having a plurality of apertures; and mounting a plurality of ball bearing units in the apertures, wherein the ball bearing units are level to within $1/16$ of an inch.

6. The method of claim 5 wherein the self-leveling coating is applied as a first layer and a second layer.

7. The method of claim 6 wherein the first layer is allowed to cure before the second layer is applied.

8. A method of installing a level ball bearing floor, the method comprising:

forming a base from concrete;

applying a self-leveling coating over the base, wherein the self-leveling coating produces a surface that is level to within $1/16$ of an inch;

forming a ball bearing transfer deck by mounting a plurality of support plates on the self-leveling coating, each of the support plates having a plurality of apertures, wherein the ball bearing transfer deck is level to within $1/16$ of an inch; and mounting a plurality of ball bearing units in the apertures, wherein each of the ball bearing units remain level to within $1/16$ of an inch as pallets containing loads of up to approximately 10,000 pounds are moved over the ball bearing floor.

9. The method of claim 8 wherein a pallet containing a load of up to approximately 10,000 pounds is movable over the ball bearing floor with a force that is less than 25 pounds per 1,000 pounds of load on the pallet.

* * * * *